United States Patent [19]
Penque

[11] 3,933,577
[45] Jan. 20, 1976

[54] PROCESS OF SONICALLY TREATING MUNICIPAL WASTE TO PRODUCE HIGH QUALITY PAPER PULP AND FERTILIZER

[75] Inventor: Ronald A. Penque, Glen Ridge, N.J.

[73] Assignee: Biocel Corporation, New York, N.Y.

[22] Filed: Oct. 9, 1973

[21] Appl. No.: 404,305

Related U.S. Application Data

[63] Continuation-in-part of Ser. No. 105,123, Jan. 8, 1971, Pat. No. 3,850,771.

[52] U.S. Cl. .............. 162/4; 71/14; 162/5; 162/8; 162/50
[51] Int. Cl. .............. D21b 1/32; D21c 5/02
[58] Field of Search ............. 162/50, 4, 5, 6, 8, 191; 71/14, 34

[56] References Cited
UNITED STATES PATENTS

| | | | |
|---|---|---|---|
| 1,421,195 | 6/1922 | Eyrich et al. | 162/8 |
| 1,579,461 | 4/1926 | Winestock | 162/4 |
| 2,832,663 | 4/1958 | Drelich | 162/5 X |
| 2,872,313 | 2/1959 | Hodse et al. | 162/6 |
| 3,011,875 | 12/1961 | Sumner | 71/34 X |
| 3,098,784 | 7/1963 | Gorman, Jr. | 162/5 |
| 3,579,320 | 5/1971 | Pesses | 71/14 X |
| 3,597,308 | 8/1971 | Brooks | 162/4 |
| 3,850,771 | 11/1974 | Penque | 264/176 |

OTHER PUBLICATIONS
"The Deinking of Paper," Copyright 1943, by the Institute of Paper Chemistry, p. 1–11.

Primary Examiner—S. Leon Bashore
Assistant Examiner—Alfred D'Andrea, Jr.
Attorney, Agent, or Firm—Morton C. Jacobs

[57] ABSTRACT

Municipal solid waste is treated by a method in which pollution of air, water and soil is minimized. Light, long fiber paper pulp which is in great demand and fertilizer which controllably releases its nutrients are recovered which render the treatment efficient and economical. The solid waste after removal of ferrous and non-ferrous metals, glass and other aggregates, is sonically pulped to prevent shearing of fibers using such chemicals that when subsequently phosphated, and xanthated if desired, will cause salts to precipitate with inks, coatings and waxes removed from the fibers to provide fertilizers with controlled nutrient release on the one hand and high quality paper pulp on the other.

35 Claims, 3 Drawing Figures

PROCESS OF SONICALLY TREATING MUNICIPAL WASTE TO PRODUCE HIGH QUALITY PAPER PULP AND FERTILIZER

This invention relates to the treatment of municipal solid waste or garbage and constitutes a continuation-in-part of my copending application Ser. No. 105,123 filed Jan. 8, 1971, now U.S. Pat. No. 3,850,771.

Conservative estimates place the yearly United States solid waste load at 180 million tons which is expected to become 285 million tons per year by 1980. The primary object of this invention is not to provide an efficient means of disposing of the solid waste but rather to so treat it that useful end products, such as profitable long fiber light pulp, fertilizers, and structural materials can be obtained, with minimum adverse impact on the environment.

Another object of the invention is to provide a process of treating solid municipal waste in which inks, coatings, waxes and the like materials are removed from the paper and paper products in the waste by chemical agents which can readily be removed from the pulp with the contaminants to form fertilizers, the nutrient content, i.e., N, P, K, Mg, S, of which can be varied and controlled by the concentrations and amounts of the treatment chemicals added in the system.

Another object of the invention is to provide a process of treating solid municipal waste in which the compounds precipitated with the inks, coatings, waxes, etc., and forming the soil nutrients can be xanthated, with additional short fiber pulp or other cellulosic rejects of the system, and then converted to an alpha cellulose binder, as disclosed in the aforesaid parent application, Ser. No. 105,123, with the result that the fertilizer composition can be extruded into rods or other forms for predetermined nutrient concentrations which release the nutrients to the soil, controllably.

Another object of the invention is to provide a process of treating solid municipal waste in which the removal of the inks, coatings and waxes from the fibers of the paper pulp is carried out not only with fertilizer forming chemicals but in a zone employing sonic or shock waves to effect such removal without breaking the fibers.

Another object is to provide a process of treating solid municipal wastes to simultaneously produce fertilizers and long fiber paper pulp but to carry out the process economically in such a manner that discoloration of the pulp is minimized to thereby produce a higher quality light long fiber pulp for which there is a great need in the industry.

Another object is to provide a process of treating solid municipal waste of the character above described in which the water recovered in the process is of especially good quality for recycling since it has a pH of about 7.5 and contains a solvent and wetting agent required in the de-inking, de-coating and de-waxing phase of the process. Moreover, since the volume loss of water in the process is relatively small, the demands on the municipal water supply to treat the solid wastes are also minimal.

Another object of the invention is to provide novel fertilizer products in which the nutrients can be controllably released to the soil, which products result from the process of treating the municipal solid wastes in such a manner that high quality, light, long fiber pulp is also produced.

Yet another object of the invention is to provide a treatment of municipal solid waste which economically and efficiently recovers ferrous and non-ferrous metals, glass, and the like as well as high quality, long fiber light pulp and fertilizers thereby rendering the overall process profitable with minimum impact on the environment in carrying out the process.

Other objects and special features of the invention will become more apparent as the following description proceeds in conjunction with the accompanying drawing wherein.

Figure 1:
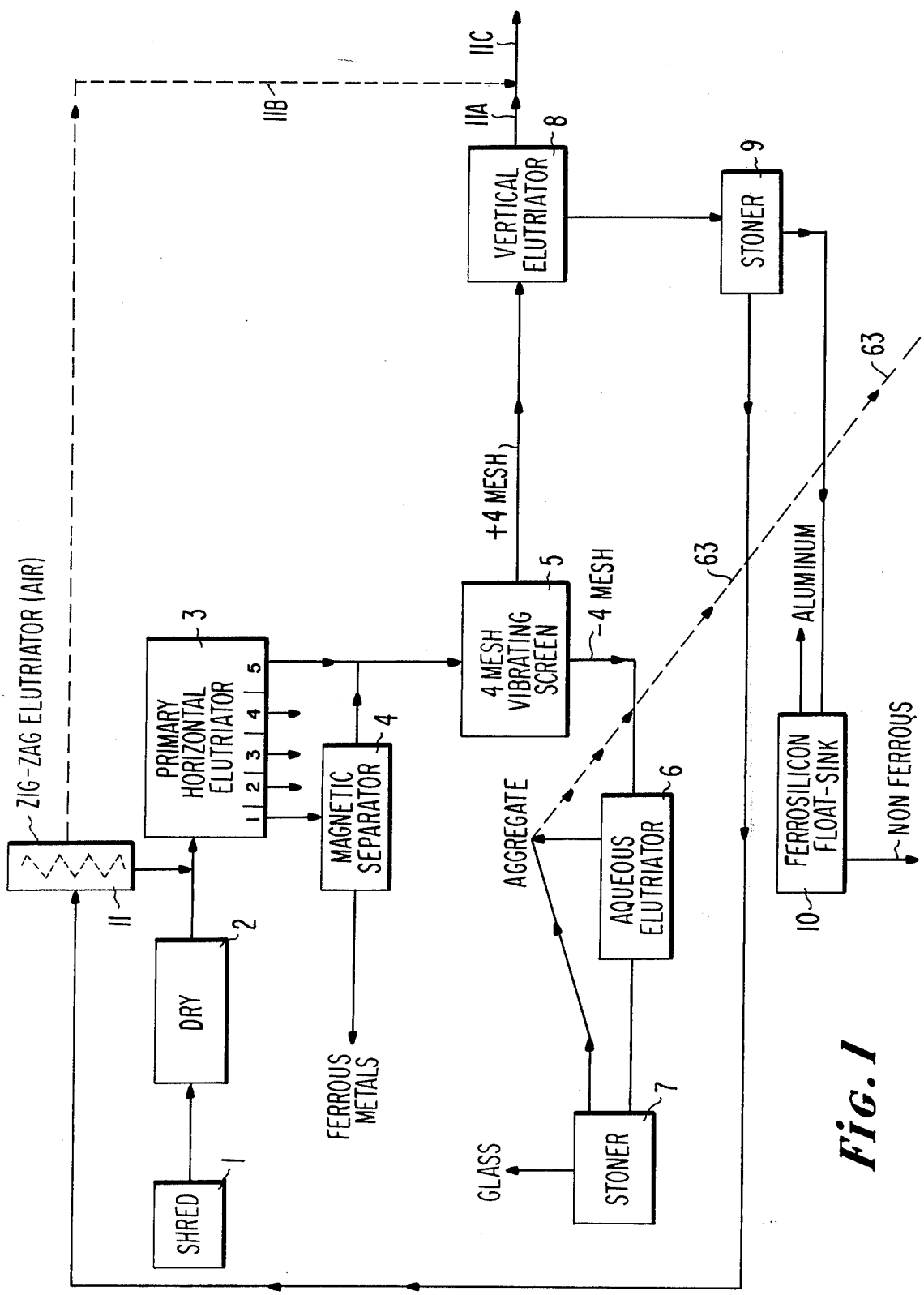
FIG. 1 is a block diagram of the first portion of the process wherein the ferrous and non-ferrous metals, glass, ceramics and other aggregates are separated from the solid municipal waste.

To begin with, it is well recognized in the literature that municipal or urban solid waste (garbage) varies in composition geographically and socio-economically. Such waste is classified by the Bureau of Solid Waste Management in nine essentially mutually exclusive components each of which is similar in composition and BTU content: (1) food waste, (2) garden waste, (3) paper products, (4) plastic, rubber and leather, (5) textiles, (6) wood, (7) metal products, (8) glass and ceramic products and (9) ash, rock and dirt. While many methods of sampling and analyzing such wastes have been devised, it is unnecessary to effect such analysis prior to carrying out this invention. Applicant has adopted the East Coast standards as representative and typical of the composition of East Coast municipalities. The U.S. East Coast standard refuse composition is as follows, in weight percent:

| Physical | | Rough Chemical | |
|---|---|---|---|
| Cardboard | 7% | Moisture | 28.0% |
| Newspaper | 14 | Carbon | 25.0 |
| Miscellaneous Paper | 25 | Hydrogen | 3.3 |
| Plastic Film | 2 | Oxygen | 21.1 |
| Leather, molded | | Nitrogen | 0.5 |
| plastics, rubber | 2 | Sulfur | 0.1 |
| Garbage | 12 | Glass, Ceramics, etc. | 9.3 |
| Grass and dirt | 10 | Metals | 7.2 |
| Textiles | 3 | Ash, other inserts | 5.5 |
| Wood | 7 | Total | 100.0 |
| Glass, Ceramics, Stone | 10 | | |
| Metallics | 8 | | |
| Total | 100.0 | | |

See Kaiser, E. R., "Refuse Reduction Process" reported in "Proceedings, the Surgeon General's Conference on Solid Waste Management for Metropolitan Washington", U.S Public Health Service Publication No. 1729, Government Printing Office, Washington, D.C. July, 1967, p. 90.

Any solid urban waste can be employed in the instant invention provided it contains a minimum of about 10 percent by wt. of paper products to insure proportionality of the process.

The solid waste is first shredded preferably on a vertical axis shredder, as at 1, to a maximum particle size of 6 inches, then dried, as at 2, to a maximum moisture content of 30 percent by wt. of the input waste. The dried shredded waste is then sent through a primary air elutriator, as at 3, preferably horizontal for the sake of efficiency, to yield a primary split of the waste or garbage into two components. The heavy fraction is primarily metallic whereas the lighter fraction comprises paper products, plastics, textiles, leather, rubber and other light materials. This method of separation by air elutriation is known in the art. See Preliminary Separation of Metals and Non-Metals from Urban Refuse, Bureau of Mines Technical Program Report, June, 1971, TPR 34, Solid Water Research Program, by K. C. Deane, et al.

The primarily heavy metallic fraction, consisting of about 18.3 percent by wt. of the total waste input, is then subjected to magnetic separation, as at 4, yielding about 5.4 percent by wt. of the input and thus representing about 92 percent recovery of the ferrous metals originally present in the urban waste. The non-magnetic material remaining, about 12.9 percent by wt., which was not retaianed by magnetic separation, is recombined with the heretofore separated light materials and the recombined stream is exposed, as at 5, to a vibrating screen of about 1–8 mesh, preferably 4.

The −4 mesh material represents about 18.7 percent by wt. of the total input and comprises about 13 percent by wt. of combustible matter and about 87 percent by wt. of non-combustible matter. This represents about 3 percent by wt. of the total combustibles originally present and about 87 percent of the non-combustibles content.

The −4 mesh material is then subjected to aqueous elutriation, as at 6, of the cyclone sink-float type well known in the art. The heavy or sink fraction, about 9.9 percent by wt. of the input waste, contains about 84 percent by wt. glass and about 16 percent by wt. other non-combustibles, representing a recovery of about 83 percent by wt. of the original glass content.

The glass fraction is then processed in a stoner 7. Such an apparatus is commercially available from Sutton, Steele, and Steele and separates material by differences in specific gravity using a column of air to suspend lighter materials and straight line vibratory motion to carry away the heavier components which remain unfluidized on the deck. The stoner increases the glass content, which is the lighter fraction, from about 84 to about 94 percent by wt. of the original waste input, the purity of the glass being about 98 percent. The heavier rejected fraction of the stoner, or aggregate, comprises ceramics, metallics, stones, etc., and represents about 0.6 percent by wt. of the original waste input.

The float fraction of the aqueous elutriator 6 represents about 8.8 percent by wt. of the original waste input and has a combustible content of about 27 percent by wt., a glass content of about 7 percent by wt. and a non-combustible content of about 66 percent by wt. of the waste input. The float fraction comprises about 12 percent by wt. paper products and is combined with the 0.6 percent rejects of the stoner and xanthated or used as such as a stable land fill.

The +4 mesh material is about 75.9 percent by wt. of the original waste input and comprises about 97 percent by wt. combustibles and about 3 percent by wt. non-combustibles. This represents a recovery of about 97 percent by wt. of the original combustible content and contains only about 12 percent by wt. of the original non-combustile content.

The +4 mesh material is then fed through a vertical air elutriator column 8, as described in the Bureau of Mines reference hereinbefore. The light float fraction represents about 40.3 percent by wt. of the original waste input and comprises about 85 percent by wt. light paper (newsprint) and about 13 percent by wt. heavy paper (cardboard, Kraft, etc.) and about 2 percent by wt. other combustibles, such as plastic film, etc.

The sink portion of the vertical elutriator 8 represents about 35.6 percent by wt. of the original waste input and has a paper content of about 61 percent by weight of that sink portion. About 33 percent by wt. of the sink portion is other combustibles, and about 6 percent by wt. is non-combustibles, primarily non-ferrous metals.

The sink portion of the vertical elutriator 8 is put through a stoner 9 which removes about 6 percent by wt. of this stream which represents about 2.1 percent by wt. of the total waste input and is primarily non-ferrous metals.

The non-ferrous metal stream is fed to a heavy media separator 10 containing a ferro-silicon water slurry having a sp.g. of 2.95. In this heavy media, the light aluminum fraction floats while the heavier metals sink.

Two separate streams exit from the separator, one containing the sink fraction and the other the float fraction. These go to separate screens (not shown) where most of the fine ferro-silicon material is removed from the larger non-ferrous metal and is collected in a tank (not shown). The non-ferrous metals are then transferred to screens (not shown) equipped with water sprays to wash out the remaining ferro-silicon from the metals. The float product contains about 96 percent by wt. aluminum and the sink product about 38 percent by wt. copper, 5 percent by wt. lead, 2 percent by wt. zinc, 3.5 percent by wt. nickel and many other trace metals. See the Bureau of Mines publication cited hereinbefore.

The light portion from the stoner 9 which represents about 94 percent by wt. of what was fed into it is then passed through a zig-zag air elutriator 11 in which the float fraction, representing about 18 percent by wt. of the total input waste, is essentially paper products. This float fraction is married with the float fraction of the vertical elutriator 8.

The sink fraction of the zig-zag elutriator contains adhering metals and other debris and is fed back into the system. It comprises about 15 percent by wt. of the total input or garbage and all of it is combustible matter of intermediate density. Upon a second pass through the primary horizontal elutriator 3 an additional 3 percent by wt. of paper is recovered at the light end of the vertical elutriator 8 when equilibrium is reached in the system. The remaining portion of the refed material comprises textiles, leather, rubber and other combustible non-paper products combined with some wood and heavy paper. This collects in intermediate bins 2, 3, and 4 of the horizontal elutriator 3 and is removed periodically, secondarily shredded and admixed with other aggregate streams.

At this stage the light or float stream 11A from the vertical elutriator 8 plus the light stream 11B from the zig-zag elutriator, which constitutes in some excess of 40 percent by wt. of the original waste input, about 88 percent by wt. paper products and about 2 percent by wt. other combustibles, such as plastic film, is acted upon in a series of sequential and branch steps to produce as end products fertilizers of desired composition and controlled release and high quality, long, light fiber paper pulp.

The float stream from the vertical elutriator merged with the light stream from the zig-zag elutriator is then fed into zones in which the pulp fiber is not broken and ink, coatings, and waxes are lifted and separated from the fibers and precipitated with chemicals which act to provide fertilizer nutrients on the one hand and light, long fiber pulp on the other. The merged float stream is fed into a sonic pulper 12, a device which includes a large vertical tank open at its top to receive the stream, chemicals and water and a large rotating disk adjacent its bottom having vanes on its circumference designed to cause cavitation in the liquid medium when the disk rotates at high speed, i.e., peripheral speed of about 145 ft./sec. minimum. Tearing and shearing action are minimized because the vanes are relatively small and, when operated at the aforementioned high peripheral speed, produce sonic shock waves which defiber the paper products without shearing the fibers. Such apparatus is described in Brown U.S. Pat. No. 3,420,454. Although the paper and other fibrous material are completely pulped by the sonic waves, very little if any breakdown of the non-fibrous materials present, such as plastic pieces and films, occurs. This simplified the separation of the defibered pulp from the plastics.

The chemicals added to the sonic pulper perform the dual function of de-inking, de-coating and de-waxing the fibers and removing all other contaminants and of eventually forming soil nutrients or fertilizers upon subsequent reaction with phosphate ions causing a precipitate to form which contains the soil nutrients, the removed inks, coatings, waxes and other contaminants including putrescibles which remained on the paper products when the light stream entered the sonic pulper.

At this point it would be well to set forth a specific non-limitative example of a pilot run of the process starting at the sonic pulper 12. Into a 250 h.p. sonic pulper was charged 3,000 lbs. of the light stream from the vertical elutriator representing about 61.3 percent by wt. of the total input weight of the waste or garbage containing in excess of 95 percent by wt. of paper and paper products.

Also charged into the sonic pulper were the following:

921 lbs. dolomitic lime (325 mesh)
668 lbs. ammonium hydroxide (28 percent)
200 lbs. calcium hypochlorite
500 lbs. methylprilidone
25 lbs. tergitol 15S9 (Union Carbide) (a linear ethoxylate having 9 moles of ethylene oxide)
60,000 lbs. water The pH of this composition, for the particular dolomitic lime (Charles Pfizer, Ohio deposit), was 12. The pH may be further reduced to a lower alkalinity (e.g., 9.5 to 10) by a suitable acid such as phosphoric, sulphuric or nitric.

The water is added first to the sonic pulper, then the light or float stream from the vertical elutriator enters, agitation is initiated, and finally the rest of the aforementioned chemicals are added. The pulper was run for about 12 minutes. During the last 2 minutes, 40,000 lbs. additional water was added to the sonic pulper 12 while the bottom drain was open so that the entire charge was discharged into a consistency dilution holding tank 14. The initial consistency in the sonic pulper 12 was about 5 percent and was reduced to a consistency of about 3 percent in the holding tank 14.

Additional water was added to the consistency dilution tank to reduce the consistency to about 0.5 percent and then the pulp slurry was passed through a 2 mesh screen 16 which removed the textiles, plastic film, rubber and leather amounting to about 68 lbs. The material passing through the screen was then sent into a conventional low efficiency (low pressure drop — 5 psi) cyclone pre-cleaner 18 where bits of glass, sand, thermosetting plastics, ceramics, staples, etc. fell to the bottom and were removed.

The stream was then passed through a pressure screen 20 to remove shives, grit and a small amount of unpulped paper.

The stream 21 was then passed through a screw press 22 where the consistency was increased to 40 percent by wt. of pulp and the liquid effluent was discharged into a precipitator tank 24 which was maintained at about 60°C.

Figure 2:
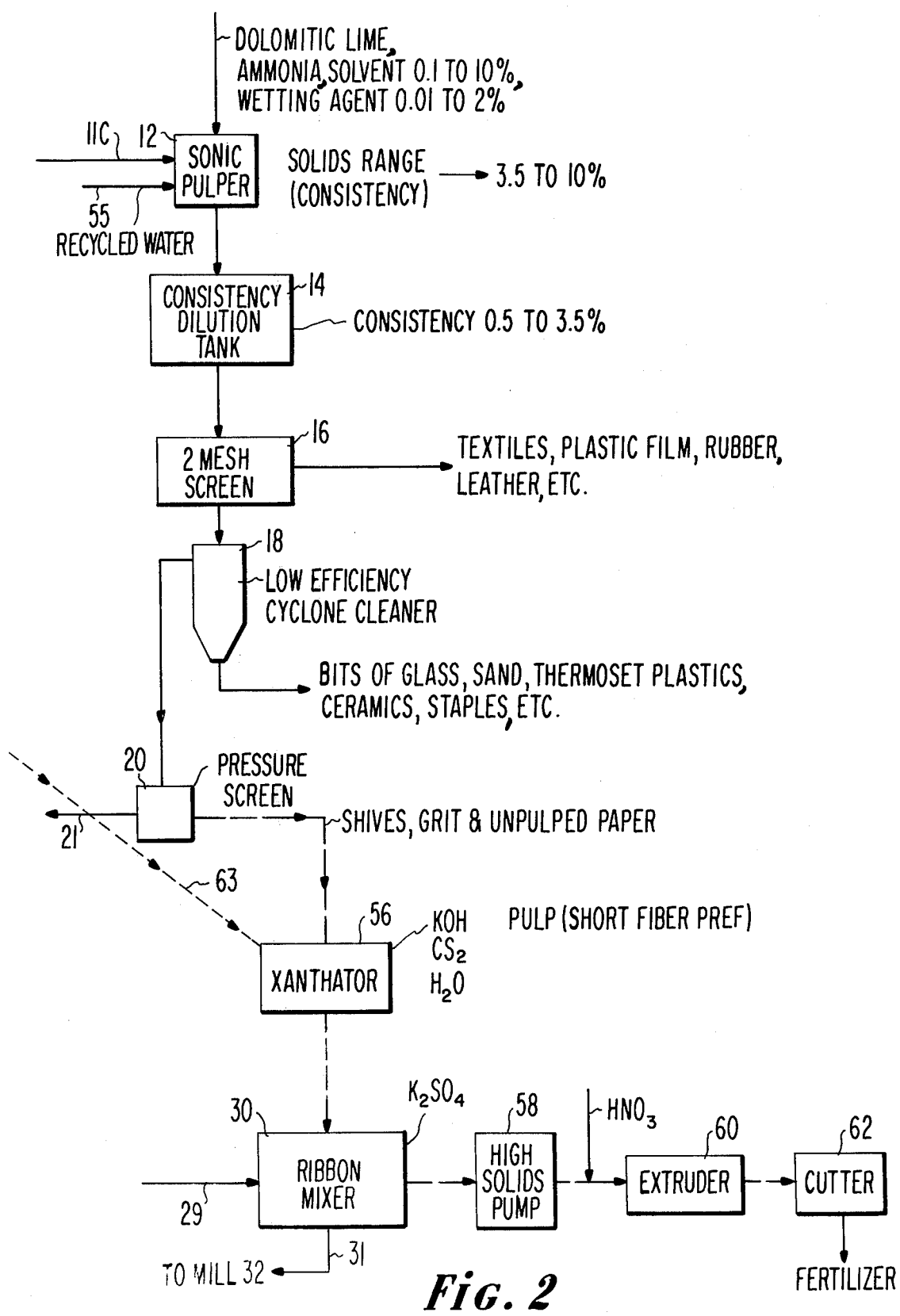
FIG. 2 is a block diagram continuing from FIG. 1 and illustrating the production of the fertilizer phase of the invention.

Into the precipitator tank was charged about 1,884 lbs. of phosphoric acid (52 percent solution) which gave a pH of about 7.5 and caused extensive precipitation. The contents of the precipitator tank were pumped into a settling tank 26 equipped with a screw discharge 28 to remove the settled solids which (together with the further settled solids removed by centrifuge 50) then went as at 29 to a ribbon mixer 30 (FIG. 2) to which was added about 270 lbs. of potassium sulfate, which ribbon mixer was steam jacketed to dry the product.

Figure 3:
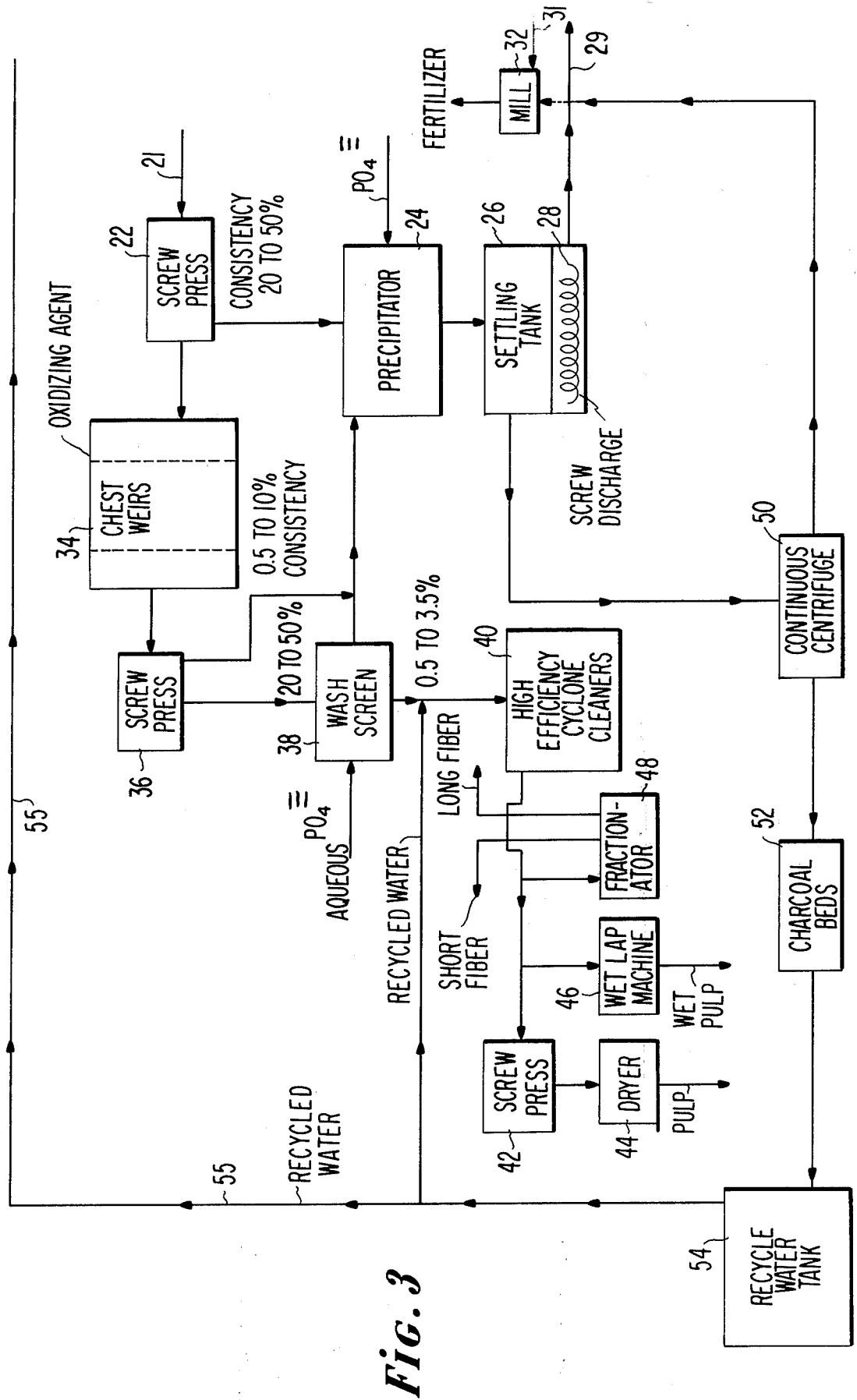
FIG. 3 is a block diagram continuing from FIG. 2 and related to FIG. 1 and illustrating the paper pulp separation and production phase of the invention.

The contents of the ribbon mixer were milled as at 32 (FIG. 3) to about 20 mesh as a fertilizer yielding about 2,050 lbs., the approximate analysis of which was about 7% N, 40% $P_2O_5$, 6% K, 15% MgO, 1.67% S, all by wt. The fertilizer also contained about 6.5 percent by wt. inks, coatings, waxes, adhesives and putrescibles which came down with the precipitate in the precipitator, none of which are soil pollutants. Alternatively, the settled solids from the screw discharge can go to a dryer other than a steam jacketed ribbon mixer and then to a mill 32 to provide the fertilizer as shown in FIG. 3.

Instead of the dolomitic limestone ($CaCo_3$ and $MgCo_3$ mole for mole) one may substitute CaO, MgO, $CaCO_3$ or $MgCO_3$ or mixtures thereof in stoichiometric amounts necessary to form calcium or magnesium ammonium phosphate in the neutralizer.

Also, in the sonic pulper, stoichiometric amounts of KOH, $K_2CO_3$, $KHCO_3$ or any other soluble potassium salt can be added in which case the subsequent addition of $K_2SO_4$ or any other potassium salt to the ribbon mixer becomes unnecessary. The potassium salt may be used with calcium and/or magnesium salts, in which case the double salt of $CaK\ PO_4$ or $Mg\ KPO_4$ will precipitate out. Technically, alkaline potassium salts can replace the ammonia all or in part, but the N required for the fertilizer would have to be added at a later stage. It is preferred that ammonia be added in the sonic pulper and a potassium ion elsewhere.

As a source of nitrogen to be added to the sonic pulper any water-soluble ammonium salt may be used such as $(NH_4)_2CO_3$, $NH_4HCO_3$, $NH_4Cl$, $NH_4NO_3$, $(NH_4)_2SO_4$, $NH_4CH_3CO_2$, except that where the ammonium salt has an acid pH, the pH of the charge should be rendered alkaline up to a pH of 10.5 with other soluble compounds, preferably KOH to add the K ion. The quality of ammonium salt required is that stoichiometric amount needed to form the metal ammonium phosphate.

The type of solvent required is one which is water soluble and will dissolve polymeric, asphaltic, lipophilic and normally water-insoluble contaminants of the fibers. Highly aprotic solvents, such as dimethylformamide, dimethylsulfoxide, methylpyrilidone, etc., have the broadest solvating action and should be used from about 0.1 to about 10 percent by wt. of the water initially charged into the sonic pulper. Other solvents found useful are methyl, ethyl and isopropyl alcohols, water soluble glycol ethers, and ethoxy alcohols such as Carbitol and Cellosolve.

The action of the solvent is to penetrate the fibers and lift off the inks, coatings, waxes, adhesives and other contaminants including putrescibles rendering them emulsifiable by solvation and coupling with the wetting agent. Any wetting agent may be used provided it is salt stable and does not precipitate insoluble metal soaps, i.e., calcium, magnesium, etc., and will tolerate high pH such as, for example, the non-ionic ethoxylated nonyl and octyl phenols, such as Triton X–100 made by Rohm and Haas, Tergitol NPX made by Union Carbide and the linear ethoxylated non-ionic wetting agents, such as Tergitol 15S9 made by Union Carbide, selected alkylaryl sulfonates having 4–30 C atoms in the alkyl substituent such as sodium dodecylbenzylsulfonate, sorbitol base surfactants, etc. The concentration of the wetting agent should be about 0.01 to about 2 percent by wt. of the water added to the sonic pulper. Thus, the wetting agent and the coupling solvent form a stable emulsion of the water insoluble fiber contaminants such as asphaltic materials, polymeric coatings, waxes, hot melt adhesives, oil, etc. The wetting agent also serves to disperse the particulate matter such as clays from coatings, carbon black and pigments from the inks, etc.

The oxidizing agent serves to decompose organic matter and thereby render it soluble or emulsifiable, such as proteinaceous glues and coatings, starches, gums, natural resins, etc., which are normally neither solvent or water soluble. It also serves to kill microorganism contamination and to decolorize contaminants and dyes and thus lighten the pulp.

The oxidizing agents may be selected from hypohalites, such as calcium hypochlorite, sodium hypobromite, etc., peroxides such as $H_2O_2$, $Na_2O_2$, $K_2O_2$, urea peroxide, persulfates, perborates, and so forth, which are water soluble and oxidize in alkaline pH.

Calcium hypochlorite is preferred for the sake of economy. However, when processing pulp with high ground wood content in the past, the use of hypochlorite was prohibited because of chromophore development in the lignin badly discoloring the pulp. The employment of the mildly alkaline MgO, CaO, $NH_4OH$ in the sonic pulper and the ease of de-inking could eliminate this color development problem.

An additional cost saving is realized by on site hypochlorite production with a portion of the dolomitic lime.

The optimum range of hypochlorite or other oxidizing agent utilizable is from 0.2 to 2.0 percent by wt. based on the weight of the fiber.

In addition to the oxidizing agent being added in the sonic pulper, the oxidizing agent may be added in the weir chest (to be later described) or in either place, depending on the degree of whiteness required in the end product pulp. Because all input chemicals other than the oxidizing agent are either recovered for sale at a profit, or recycled in the system, additional oxidizing and bleaching steps heretofore uneconomical are possible because the oxidizing agent is the only significant expended chemical used in the process.

The use of urea peroxide was found to be especially advantageous because it dissociates to $H_2O_2$ and urea, the $H_2O_2$ becoming water and the urea contributing to the total N content of the fertilizer.

The consistency of the slurry from the sonic pulper is altered to optimize the handling of the slurry at each subsequent step. A consistency of from 3.5 to 10 percent by wt. in the sonic pulper is desirable at that stage and is then reduced to a consistency of 0.5 to 3.5 percent by wt. before passing through screens 16, the cyclone cleaners 18, the pressure screen 20, etc.

Coming now to the pulp treating and recovery portion of the invention, it is to be noted that the screw press 22 removes about 92 to 94 percent of all the water and chemicals originally present and the pulp has increased in consistency to about 20–50 percent. It then goes to a chest weir 34 where the slurry is cascaded from top to bottom and rinsed with a counter-current flow of water. Additional oxidizing agent may be added at this stage, if more pulp whiteness is desired, and the pulp consistency is reduced back to about 0.5 to 10 percent so that subsequent treatment in the next screw press 36 can be efficiently operated.

From the second screw press 36, more contaminants are returned to the precipitator 24 and the pulp, which has now increased in consistency back to 20–50 percent, goes to a wash screen 38. The pulp is retained on the screen while counter-current wash with phosphate ions removes all residual chemicals and contaminants, which then pass through the screen. The precipitate in fine grain dispersed form passes through the pulp and screen, and the pulp is washed and neutralized by phosphate ions going through. The dispersed effluent is also fed to the precipitator 24.

The pulp is then diluted either with fresh or recycled water to a consistency of about 0.5 to 3.5 percent pulp and then goes to high efficiency cyclone cleaners 40 to remove remaining grit.

This pulp can then be either squeezed in another screen press 42, and dried as at 44 to yield a light long fiber pulp or processed on a wet lap machine 46 to produce wet shippable pulp for use in paper mills. The pulp may also be fractionated as at 48 into short and long fibers using different screens and water.

At the settling tank 26, clear liquid is pumped out (decanted) to a continuous centrifuge 50 which removes any additional suspended matter for admixture with the fertilizer.

The effluent of the centrifuge is sent to charcoal beds 52 to remove soluble colors and is stored in a recycle water tank 54. At this tank the composition of the water comprises about 1 percent or less by wt. of dissolved phosphates and an excess of 90 percent of the solvent and wetting agent which was added to the sonic pulper. The water is also at a pH of about 7.5, the optimum pH for the phosphate precipitation, which renders the water desirable for recycling to the sonic pulper.

From the settling tank 26, the settled matter, which consists essentially of $MgNH_4PO_4$ and $CaNH_4PO_4$ precipitates and removed inks, coatings, waxes, etc., is screw discharged and suitably dried, milled and bagged as fertilizer as indicated hereinbefore.

To produce a fertilizer with varied amounts of N, P, K, Mg and S, one need only vary the amounts of equivalent chemicals for addition to the sonic pulper 12, precipitator 24 and ribbon mixer 30.

Xanthation can be used alternatively with regard to fertilizer formation between the pressure screen 20 and the ribbon mixer 30. The xanthation is preferably carried out as at 56 with KOH to add K to the fertilizer. The cellulose required for xanthation can come from the float of the aqueous elutriator 6, supplemented if necessary by short fiber pulp from the fractionator 48.

The xanthation is fully described in my copending application Ser. No. 105,123. To the xanthating vessel is fed aggregates from the aqueous elutriator 6, if desired, short fibers from the fractionator 50 and a portion of the stream from the pressure screen. Water and an alkali, preferably KOH, in an amount preferably of about 1.8 to 2.8 times the weight of the cellulose content are added for a time (15 mins. to 2 hrs.) and temperature (15° to 35°C) to convert the cellulose into alkali cellulose. Then $CS_2$ is added, preferably with agitation, until from 0.5 to 2.0 hydroxyl units are reacted for each anhydroglucose unit.

The cellulose xanthate is then sent to the ribbon mixer 30 where it is admixed with the metal ammonium phosphates and removed inks, coatings and waxes from the settling tank 26 and continuous centrifuge 50. The material from the ribbon mixer may then be converted to the alpha cellulose which becomes the binder and coater for the fertilizer component particles. This can be accomplished by compressing the material to express the moisture. The resulting slab or block of material can then be cut to various shapes and sizes.

Preferably, the material is pumped by a high pressure pump 58 to an extruder and, prior to entrance in the extruder, acid is added in line to change the pH of the material from alkaline to acid which also causes the formation of alpha cellulose which acts as a binder and coater for the fertilizer compound particles. The mass is such that it can be extruded as at 60 and cut as at 62 into short rods or other forms having predetermined concentrations and amounts of the nutrient atoms N, P, K, Mg and S.

While the output from the ribbon mixer 30 may be so controlled that one portion goes directly to the mill 32 and the other through the extruder, it is preferred from a practical standpoint that the two processes be carried out alternatively (as indicated by broken lines in FIG. 2); that is, when the xanthation takes place the output from the ribbon mixer 30 goes to the extruder and not directly to the mill 32.

Xanthation also enables one to use all of the rejected grits and aggregates 63 as a diluent bound with the fertilizer chemicals. By varying the amount of xanthate and the density of the extruded cellulose-bound fertilizer (i.e., varying extrusion pressure primarily) additional control of the rate of nutrient release, other than that inherently present because of the limited solubility of the phosphates, can be effected.

In the soil, the cellulose slowly decomposes by microbiological action and slowly and evenly releases the nutrients. The rate of microbiological decomposition of the cellulose is increased by the released nutrients which are microbe nutrient as well as soil nutrient. Therefore, the rate of decomposition of the cellulose, which is impracticably slow by itself, is at a suitable controlled rate when the cellulose binds and coats the fertilizer nutrients.

It should be noted that the precipitator is maintained at about 60°C. Any temperature may be used as long as precipitation of the Ca or $MgNH_4PO_4$ is effected. 60°C is chosen to produce the monohydrate and thus make it possible to sell a fertilizer with less water. A magnesium salt is used because it is now well recognized in the literature that Mg is a very good plant nutrient. It is called the fifth major plant nutrient. $MgNH_4PO_4$ is released fairly slowly to the soil. But when the compound is xanthated using KOH to produce pellets or flakes, an effective means is obtained for releasing the K component substantially at the same rate as the $MgNH_4PO_4$.

Most commercial fertilizers require anti-caking non-soil nutrient additives such as colloidal silicas, methoxyethyl cellulose, etc. However, the fertilizers of the instant invention are phosphates co-precipitated with inks, coatings, waxes and adhesives which perform several simultaneous useful functions in that they serve to prevent caking of the fertilizer partilces and themselves provide a small organic nutrient contribution as well as trace elements such as Mn, Cu, Zn, B, Se, etc., required for plant growth which originate from the organometallic inks.

It will also be noted that the process of the instant invention is quite versatile in that it also allows for balancing the plant nutrient atoms at various stages of the process and of controlling their release to the soil while permitting recovery of light long fiber, de-inked, de-coated and de-waxed paper pulp.

The process of producing high quality paper pulp and fertilizer can be effected with paper and paper products per se or a mixture of paper and paper products and non-fibrous combustibles as the primary source to be fed into the sonic pulper 12 with the calcium or magnesium compounds or mixtures thereof, the ammonium compound, the solvent and the wetting agent at a pH of 7.1 to 10.5 followed by the subsequent treatments as described hereinbefore. To secure substantially complete de-inking while suppressing chromophore development, the optimum pH should be 8.2–9.

What is claimed is:

1. A process of treating solid municipal waste containing at least 10 percent by wt. of paper and paper products to produce de-inked, de-coated and de-waxed long fiber pulp and fertilizer comprising first removing ferrous and non-ferrous metals, glass, ceramics and the like to form a stream comprising a major portion of paper and paper products and a minor portion of other combustibles, subjecting said stream to sonic pulping to prevent shearing the fibers in the presence of water and chemicals including a calcium or magnesium compound or mixtures thereof, an ammonium compound, a solvent and a wetting agent at an alkaline pH of 7.1 to 10.5, separating the non-paper pulp combustibles to leave a slurry of paper pulp and the added chemicals, separating the chemicals and water from the slurry, reacting the separated chemicals with phosphate ions to form a precipitate of calcium or magnesium ammonium phosphate or mixtures thereof carrying ink, coatings, waxes and adhesives therewith, allowing the precipitate to settle out and removing it for use as a fertilizer, and removing the pulp from the slurry and separating the fibers therefrom.

2. The process of claim 1 and adding an oxidizing agent in the sonic pulping zone to decompose organic matter and thereby render it soluble or emulsifiable and to lighten the pulp.

3. The process of claim 1 and adding an oxidizing agent to the pulp slurry to decompose organic matter and thereby render is soluble or emulsifiable and to lighten the pulp after separation of the non-paper pulp combustibles.

4. The process of claim 1 wherein the ammonium compound is replaced at least in part by a potassium compound in the sonic pulping zone so that the precipitated phosphate will be a magnesium or calcium potassium phosphate thereby providing the nutrient K as well as the N and P atoms in the end product fertilizer.

5. The process of claim 1 wherein the solvent is water soluble and will dissolve polymeric, asphaltic and lipophilic substances.

6. The process of claim 5 wherein the solvent is aprotic.

7. The process of claim 5 wherein the solvent is present in the sonic pulping zone in a concentration of about 0.1 to 10 percent by wt. of the water charged into the zone.

8. The combination of claim 1 wherein the wetting agent is salt stable, does not precipitate insoluble metal soaps, tolerates high pH and forms a stable emulsion of the water insoluble fiber contaminants with the solvent.

9. The process of claim 2 wherein the oxidizing agent is selected from the group consisting of hypohalites, peroxides, persulfates and perborates.

10. The process of claim 9 wherein the oxidizing agent is calcium hypochlorite in a concentration of 0.2 to 2.0 percent by wt. of the water added, the sonic pulping taking place at room temperature in the mildly alkaline pH thereby preventing in any lignin present due to chromophore development.

11. The process of claim 2 wherein the oxidizing agent is urea peroxide which upon dissociation will ultimately produce urea that effectively complexes with waxes.

12. The process of claim 1 and sequentially lowering and raising the consistency of the pulp slurry to permit it to pass efficiently through screens, screw presses and washing operations to separate the fibers therefrom.

13. The process of claim 1 wherein xanthated cellulose is admixed with the phosphate precipitate and then converted to an alpha cellulose binder by expression of water of acidification.

14. The process of claim 13 wherein the xanthated cellulose is made using KOH as the alkaline agent to add the soil nutrient atom K to the end product fertilizer.

15. The process of claim 13 and the addition of potassium sulfate to the admixture of xanthated cellulose and the phosphate precipitate to add the soil nutrient atoms K and S to the end product fertilizer.

16. The process of claim 13 wherein the conversion of the xanthated cellulose to the binding alpha cellulose is effected by acidification and the mass is extruded and cut into slugs of predetermined quantities of the soil nutrients.

17. The process of claim 16 wherein acidification is effected with $HNO_3$ to add additional soil nutrient atom N to the end product fertilizer.

18. In a process of treating solid waste containing at least 10 percent by wt. of paper and paper products after removal of the ferrous and non-ferrous metals, glass, ceramics and the like;
the improvement wherein a long fiber pulp is recovered comprising sonically pulping the waste to defiber the paper and paper products without shearing the fibers in the presence of an aqueous alkaline slurry containing a calcium or magnesium compound or mixtures thereof, a solvent and a wetting agent in a consistency range of about 3.5 to 10 percent by wt., adding water to reduce the consistency range from 0.5 to 3.5 percent by wt., separating the non-paper combustibles therefrom, expressing the chemicals and water from the slurry to decrease the pulp consistency to about 20 to 50 percent by wt., reacting the expressed chemicals with an acid to precipitate the Ca or Mg and carry with it ink, coatings, waxes and adhesives, allowing the precipitate to settle, decanting the liquid above the settled precipitate for recycling, removing the pulp from the slurry and separating the fibers therefrom.

19. The process of claim 18 in which an oxidizing agent is added to the sonic pulping zone to decompose organic matter and thereby render it soluble or emulsifiable and to lighten the fiber.

20. The process of claim 18, washing the pulp slurry prior to separation of the fibers therefrom and adding an oxidizing agent during the washing to lighten the fibers.

21. The process of claim 18 wherein the oxidizing agent is selected from the group consisting of hypohalites, peroxides, persulfates and perborates.

22. The process of claim 21 wherein the oxidizing agent is calcium hypochlorite in a concentration of 0.2 to 2.0 percent by wt. of the water added, the sonic pulping taking place at room temperature in the mildly alkaline pH thereby preventing discoloration in any lignin present due to chromophore development.

23. The process of claim 21 wherein the oxidizing agent is urea peroxide which upon dissociation will ultimately produce urea that effectively complexes with waxes.

24. In a process of treating solid waste containing at least 10 percent by wt. of paper and paper products after removal of the ferrous and non-ferrous metals, glass, ceramics and the like;
the improvement wherein a fertilizer is produced while recovering high quality paper pulp comprising pulping the waste in the presence of water, a calcium or magnesium compound or mixtures thereof, an ammonium compound, a solvent and a wetting agent at an alkaline pH not exceeding 10.5, separating the non-paper pulp combustibles from the slurry, expressing the chemicals and water from the slurry, treating the expressed chemicals with ions to precipitate $CaNH_4PO_4$, $MgNH_4PO_4$ or mixtures thereof together with inks, coatings, waxes and adhesives removed from the pulp fibers, allowing the reaction mixture to settle, drawing off the settled precipitate and removing moisture therefrom to produce a fertilizer providing the nutrient atoms N, P and Mg.

25. The process of claim 24 and the step of adding $K_2SO_4$ to the drawn off settled precipitate in a predetermined amount to add the soil nutrient atoms K and S to the fertilizer.

26. The process of claim 24 wherein a potassium compound is substituted at least in part for the ammonium compound in the first step so that upon subsequent treatment with phosphate ions magnesium or calcium potassium phosphate will precipitate to provide a fertilizer with the soil nutrient atoms N, P, Mg and K.

27. The process of claim 24 wherein the solvent is water soluble and will dissolve polymeric, asphaltic and lipophilic substances.

28. The process of claim 27 wherein the wetting agent is salt stable, does not precipitate insoluble metal soaps, tolerates high pH and forms a stable emulsion of the water insoluble fiber contaminants with the solvent.

29. The process of claim 24 wherein xanthated cellulose is admixed with the phosphate precipitate and then converted to an alpha cellulose binder by expression of water of acidification.

30. The process of claim 29 wherein the conversion of the xanthated cellulose to the binding alpha cellulose is effected by acidification and the mass is extruded and cut into slugs of predetermined quantities of the soil nutrients.

31. The process of claim 30 wherein acidification is effected with $HNO_3$ to add additional soil nutrient atom N to the end product fertilizer.

32. The A of treating paper and paper products containing inks, coatings, waxes and adhesives to produce light long fiber pulp and fertilizers comprising subjecting the paper and paper products to sonic pulping to prevent shearing of the fibers in the presence of water, a calcium or magnesium compound or mixtures thereof, an ammonium compound, a solvent and a wetting agent at an alkaline pH up to 10.5 to form a slurry of paper pulp and the added chemicals, reacting the slurry with phosphate ions to form a precipitate of calcium or magnesium ammonium phosphate or mixtures thereof carrying inks, coatings, waxes and adhesives therewith, allowing the precipitate to settle out and removing it for use as a fertilizer, removing the pulp slurry which did not settle out and separating the fibers from the liquid to produce long fiber pulp.

33. The process of claim 32 wherein the paper and paper products also contain a minor portion of non-fibrous combustibles and the step of separating the non-fibrous combustibles from the slurry prior to reacting the slurry with phosphate ions.

34. A process of treating paper and paper products containing contaminants to produce light long fiber pulp comprising subjecting the paper and paper products to pulping to prevent shearing of the fibers in the presence of water, a calcium or magnesium compound or mixtures thereof, an ammonium compound, a solvent for the contaminants and a wetting agent at an alkaline pH to form a slurry of paper pulp and the added chemicals, reacting the slurry with phosphate ions to form a precipitate of calcium or magnesium ammonium phosphate or mixtures thereof carrying the contaminants therewith, and separating the pulp slurry from the precipitate, the pulp slurry containing long fiber decontaminated pulp.

35. In a process of treating solid waste containing at least 10 percent by wt. of paper and paper products whose fibers contain contaminants;

the improvement wherein a fertilizer is produced while recovering decontaminated paper pulp comprising pulping the waste in the presence of water, a calcium or magnesium compound or mixtures thereof, an ammonium compound, a solvent for said paper contaminants and a wetting agent at an alkaline pH to form a slurry, reacting the slurry with phosphate ions to precipitate calcium or magnesium ammonium phosphate or mixtures thereof together with said paper contaminants, and removing the precipitate from the slurry for use as a fertilizer providing the nutrient atoms N, P and Mg. when the magnesium compound is used in the pulping slurry.

* * * * *